(12) United States Patent
Tischer et al.

(10) Patent No.: US 7,194,083 B1
(45) Date of Patent: Mar. 20, 2007

(54) SYSTEM AND METHOD FOR INTERFACING PLAIN OLD TELEPHONE SYSTEM (POTS) DEVICES WITH CELLULAR NETWORKS

(75) Inventors: Steven Neil Tischer, Atlanta, GA (US); Kevin Paul Kleinfelter, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 296 days.

(21) Appl. No.: 10/195,197

(22) Filed: Jul. 15, 2002

(51) Int. Cl.
*H04M 1/00* (2006.01)

(52) U.S. Cl. .......................... 379/399.01; 455/426.2; 455/554.2

(58) Field of Classification Search ............... 455/74.1, 455/554.1, 554.2; 379/373.03
See application file for complete search history.

(56) References Cited

U.S. PATENT DOCUMENTS

| | | | |
|---|---|---|---|
| 3,906,166 A | 9/1975 | Cooper et al. ................. 179/41 |
| 3,956,596 A | 5/1976 | Connolly et al. .......... 179/90 K |
| 4,268,722 A | 5/1981 | Little et al. ...................... 179/2 |
| 4,390,963 A | 6/1983 | Puhl et al. ................... 364/900 |
| 4,398,265 A | 8/1983 | Puhl et al. ................... 364/900 |
| 4,421,952 A | 12/1983 | Barnes ..................... 179/2 EA |
| 4,434,461 A | 2/1984 | Puhl ............................ 364/209 |
| 4,485,486 A | 11/1984 | Webb et al. ................... 455/33 |
| 4,486,624 A | 12/1984 | Puhl et al. ................. 179/2 EB |
| 4,549,311 A | 10/1985 | McLaughlin ................ 455/277 |
| 4,654,655 A | 3/1987 | Kowalski ................. 340/825.5 |
| 4,658,096 A | 4/1987 | West, Jr. et al. ............... 379/59 |
| 4,734,928 A | 3/1988 | Weiner et al. ............... 455/551 |
| 4,737,975 A | 4/1988 | Shafer .......................... 379/58 |
| 4,737,978 A | 4/1988 | Burke et al. ................... 379/60 |
| 4,741,018 A | 4/1988 | Potratz et al. ................. 379/58 |
| 4,751,725 A | 6/1988 | Bonta et al. ................... 379/60 |
| 4,775,997 A | 10/1988 | West, Jr. et al. ............... 379/58 |
| 4,775,998 A | 10/1988 | Felix et al. .................... 379/59 |
| 4,775,999 A | 10/1988 | Williams ...................... 379/59 |
| 4,799,253 A | 1/1989 | Stern et al. .................... 379/59 |
| 4,843,621 A | 6/1989 | Potratz ......................... 379/58 |
| 4,868,519 A | 9/1989 | Shafer ......................... 330/284 |
| 4,890,315 A | 12/1989 | Bendixen et al. |
| 4,893,327 A | 1/1990 | Stern et al. .................... 379/59 |
| 4,922,517 A | 5/1990 | West, Jr. et al. ............... 379/58 |

(Continued)

FOREIGN PATENT DOCUMENTS

EP 342 707 A2 11/1989

(Continued)

OTHER PUBLICATIONS

CellSocket www.cellantenna.com/Dockingstations/cellsocket.htm; CellAntenna Corporation; Sep. 26, 2002.

(Continued)

*Primary Examiner*—Sinh Tran
*Assistant Examiner*—Walter F Briney, III
(74) *Attorney, Agent, or Firm*—Merchant & Gould

(57) ABSTRACT

A system and method for interfacing plain old telephone system (PATS) devices with a cellular network is presented. In a broad sense, the system includes an interface that bridges the POTS devices with the cellular network. The interface is configured to convert POTS compatible signals into cellular network compatible signals, and vice versa.

52 Claims, 14 Drawing Sheets

U.S. PATENT DOCUMENTS

| | | | |
|---|---|---|---|
| 5,020,091 A | 5/1991 | Krolopp et al. ............... 455/551 |
| 5,020,094 A | 5/1991 | Rash et al. .................. 455/411 |
| 5,046,085 A | 9/1991 | Godsey et al. ............... 379/112 |
| 5,134,651 A | 7/1992 | Ortiz et al. ................... 379/112 |
| 5,185,779 A | 2/1993 | Dop et al. ...................... 379/33 |
| D339,809 S | 9/1993 | Ron ........................... D14/253 |
| 5,261,121 A | 11/1993 | Hashimoto .................. 455/89 |
| 5,287,322 A | 2/1994 | Rastegar ................ 365/230.05 |
| 5,311,477 A | 5/1994 | Rastegar ................ 365/230.05 |
| 5,323,418 A | 6/1994 | Ayerst et al. ................... 375/1 |
| 5,361,297 A | 11/1994 | Ortiz et al. ................... 379/130 |
| 5,375,258 A | 12/1994 | Gillig ............................ 455/87 |
| D354,749 S | 1/1995 | Phillips ..................... D14/151 |
| 5,406,588 A | 4/1995 | Birchler et al. ............... 375/346 |
| 5,426,689 A | 6/1995 | Griffith et al. ................. 379/58 |
| 5,430,719 A | 7/1995 | Weisser, Jr. ................ 370/58.2 |
| 5,430,761 A | 7/1995 | Bruckert et al. ............. 375/200 |
| 5,444,765 A | 8/1995 | Marui et al. ................... 379/59 |
| D362,003 S | 9/1995 | Claudio ..................... D14/240 |
| 5,469,465 A | 11/1995 | Birchler et al. ............... 375/346 |
| 5,469,494 A | 11/1995 | Ortiz Perez et al. .......... 375/27 |
| 5,471,670 A | 11/1995 | Hess et al. .................. 455/33.2 |
| 5,524,061 A | 6/1996 | Mooney et al. ............. 381/151 |
| 5,528,666 A | 6/1996 | Weigand et al. .......... 455/412.1 |
| 5,530,736 A | 6/1996 | Comer et al. ................ 455/458 |
| 5,544,227 A | 8/1996 | Blust et al. .................... 379/63 |
| 5,546,444 A | 8/1996 | Roach, Jr. et al. ........ 455/412.2 |
| 5,548,814 A | 8/1996 | Lorang et al. .............. 455/38.1 |
| 5,574,984 A | 11/1996 | Reed et al. ..................... 455/69 |
| 5,588,041 A | 12/1996 | Meyer, Jr. et al. ............. 379/59 |
| 5,598,412 A | 1/1997 | Griffith et al. ............... 370/352 |
| 5,608,655 A | 3/1997 | Moughanni et al. .... 364/514 R |
| 5,629,976 A | 5/1997 | Loke et al. .................... 379/58 |
| 5,659,698 A | 8/1997 | Weng et al. .............. 395/421.1 |
| 5,668,561 A * | 9/1997 | Perrotta et al. ............... 343/702 |
| 5,689,549 A | 11/1997 | Bertocci et al. ................ 379/61 |
| 5,689,803 A | 11/1997 | Tayloe ........................ 455/12.1 |
| 5,703,933 A | 12/1997 | Ghisler ........................... 379/58 |
| 5,715,296 A | 2/1998 | Schornack et al. .......... 455/403 |
| 5,721,732 A | 2/1998 | Emeott et al. ................ 370/437 |
| 5,724,656 A | 3/1998 | Vo et al. ..................... 455/422.1 |
| 5,751,789 A | 5/1998 | Farris et al. .................... 379/34 |
| 5,764,730 A | 6/1998 | Rabe et al. ..................... 379/58 |
| 5,771,453 A | 6/1998 | Haartsen ..................... 455/449 |
| 5,774,857 A | 6/1998 | Newlin ........................ 704/271 |
| 5,798,694 A | 8/1998 | Reber et al. ................. 340/540 |
| 5,801,654 A | 9/1998 | Traylor ........................ 341/144 |
| 5,802,481 A | 9/1998 | Prieto .......................... 702/190 |
| 5,812,637 A | 9/1998 | Schornack et al. ............ 379/59 |
| 5,818,824 A | 10/1998 | Lu et al. ...................... 370/328 |
| 5,849,433 A | 12/1998 | Venugopal et al. .......... 429/190 |
| 5,859,894 A | 1/1999 | Ortiz Perez et al. .......... 379/27 |
| 5,875,395 A | 2/1999 | Holmes ....................... 455/420 |
| 5,877,821 A | 3/1999 | Newlin et al. ............... 348/724 |
| 5,920,596 A | 7/1999 | Pan et al. ..................... 375/238 |
| 5,937,058 A | 8/1999 | Bleile et al. .................. 379/377 |
| 5,946,384 A | 8/1999 | Yee et al. ..................... 379/215 |
| 5,946,616 A | 8/1999 | Schornack et al. .......... 455/422 |
| 5,949,616 A | 9/1999 | Coon et al. .................. 360/245 |
| 5,966,428 A | 10/1999 | Ortiz Perez et al. .......... 379/27 |
| 6,002,937 A | 12/1999 | Young et al. ................ 455/462 |
| 6,009,086 A | 12/1999 | Freeburg et al. ............ 370/331 |
| 6,016,107 A | 1/2000 | Kampe et al. .......... 340/825.44 |
| 6,016,269 A | 1/2000 | Peterson et al. ............. 365/171 |
| 6,018,665 A | 1/2000 | Chavez et al. .............. 455/462 |
| 6,031,492 A * | 2/2000 | Griffin et al. ................ 343/702 |
| 6,035,215 A | 3/2000 | Goni et al. .................. 455/557 |
| 6,035,220 A | 3/2000 | Claudio et al. .............. 455/564 |
| 6,038,265 A | 3/2000 | Pan et al. ..................... 375/316 |
| 6,044,148 A | 3/2000 | Bleile ........................... 379/375 |
| 6,058,106 A | 5/2000 | Cudak et al. ................ 370/313 |
| 6,061,439 A | 5/2000 | Bleile et al. ................. 379/201 |
| 6,072,858 A | 6/2000 | Bellin ............................ 379/33 |
| 6,072,869 A | 6/2000 | Becker et al. ............... 379/386 |
| 6,078,805 A | 6/2000 | Scott ............................ 455/406 |
| 6,080,690 A | 6/2000 | Lebby et al. ................. 442/209 |
| 6,114,053 A | 9/2000 | Matsuyama et al. ........ 428/652 |
| 6,115,388 A | 9/2000 | Chinitz et al. ............... 370/441 |
| 6,115,604 A | 9/2000 | Lester et al. ................. 455/422 |
| 6,116,014 A | 9/2000 | Dalla Betta et al. ..... 340/573.1 |
| 6,121,881 A | 9/2000 | Bieback et al. .......... 340/573.1 |
| 6,122,515 A | 9/2000 | Ito et al. ...................... 455/450 |
| 6,122,531 A | 9/2000 | Nicholls et al. ............. 455/570 |
| 6,134,314 A | 10/2000 | Dougherty et al. ......... 379/207 |
| 6,137,466 A | 10/2000 | Moughanni et al. .......... 345/99 |
| 6,141,341 A | 10/2000 | Jones et al. .................. 370/352 |
| 6,151,500 A | 11/2000 | Cardina et al. .............. 455/435 |
| 6,157,545 A | 12/2000 | Janninck et al. ............. 361/814 |
| 6,192,231 B1 | 2/2001 | Chapman et al. ........... 455/401 |
| 6,212,396 B1 | 4/2001 | Brown et al. ................ 455/464 |
| 6,240,277 B1 | 5/2001 | Bright ........................ 455/74.1 |
| 6,252,867 B1 | 6/2001 | Pfeil et al. ................... 370/335 |
| 6,282,564 B1 | 8/2001 | Smith et al. ................. 709/206 |
| 6,295,348 B1 | 9/2001 | Bleile et al. ................. 379/199 |
| 6,314,299 B1 | 11/2001 | Schreib et al. .............. 455/465 |
| 6,317,064 B1 | 11/2001 | Ferrer et al. ................. 341/118 |
| 6,324,410 B1 | 11/2001 | Giacopelli et al. .......... 455/554 |
| 6,331,972 B1 | 12/2001 | Harris et al. ................. 370/313 |
| 6,396,413 B2 | 5/2002 | Hines et al. ........... 340/825.49 |
| 6,396,457 B1 | 5/2002 | Gatherer et al. ............. 343/853 |
| 6,405,027 B1 | 6/2002 | Bell ............................. 455/403 |
| 6,411,802 B1 | 6/2002 | Cardina et al. .............. 455/404 |
| 6,429,811 B1 | 8/2002 | Zhao et al. ............. 342/357.09 |
| 6,453,154 B1 | 9/2002 | Haber et al. ................... 455/90 |
| 6,480,714 B1 | 11/2002 | DePani et al. ............... 455/426 |
| 6,529,746 B1 | 3/2003 | Kotzin ......................... 455/562 |
| 6,573,938 B1 | 6/2003 | Schulz et al. ................ 348/373 |
| 6,577,952 B2 | 6/2003 | Geier et al. .................. 701/214 |
| 6,615,056 B1 | 9/2003 | Tayloer et al. ............... 455/554 |
| 6,690,923 B1 | 2/2004 | Ortiz Perez et al. ........ 455/74.1 |
| 6,704,580 B1 | 3/2004 | Fintel ....................... 455/550.1 |
| D490,063 S | 5/2004 | Miller ........................ D14/126 |
| D490,066 S | 5/2004 | Lytel ......................... D14/147 |
| D490,067 S | 5/2004 | Haney ....................... D14/147 |
| 6,741,835 B2 * | 5/2004 | Pulver ........................ 455/3.05 |
| D490,794 S | 6/2004 | Rathmell ................... D14/142 |
| D491,159 S | 6/2004 | Lytel ......................... D14/144 |
| 6,757,528 B1 | 6/2004 | Cardina et al. .............. 455/404 |
| 6,775,522 B2 | 8/2004 | Schornack et al. ......... 455/74.1 |
| 6,778,824 B2 | 8/2004 | Wonak et al. ............. 455/426.2 |
| 6,781,481 B2 | 8/2004 | Richardson ................. 333/181 |
| 6,785,517 B2 | 8/2004 | Schornack et al. ......... 455/74.1 |
| 6,788,953 B1 | 9/2004 | Cheah et al. ............. 455/550.1 |
| 6,801,159 B2 | 10/2004 | Swope et al. .......... 342/357.14 |
| 6,825,762 B2 | 11/2004 | Giacopelli et al. .......... 340/531 |
| 6,829,501 B2 | 12/2004 | Nielsen et al. .............. 600/513 |
| 6,832,082 B1 | 12/2004 | Ramasawamy et al. ..... 455/411 |
| 6,900,772 B2 | 5/2005 | Pulver ......................... 343/789 |
| 6,922,170 B2 | 7/2005 | Alexander, Jr. ............. 342/443 |
| 6,922,432 B2 | 7/2005 | Callaway, Jr. et al. ...... 375/141 |
| 2001/0040512 A1 | 11/2001 | Hines et al. ........... 340/825.49 |
| 2001/0041533 A1 | 11/2001 | Schornack et al. ......... 455/3.05 |
| 2002/0044641 A1 | 4/2002 | Wanner ....................... 379/350 |
| 2002/0086666 A1* | 7/2002 | Chen ............................ 455/417 |
| 2002/0093948 A1 | 7/2002 | Dertz et al. .................. 370/355 |
| 2002/0094776 A1 | 7/2002 | Pulver ......................... 455/3.05 |
| 2002/0146977 A1 | 10/2002 | Schornack et al. ......... 455/3.05 |
| 2003/0108189 A1* | 6/2003 | Barzani .................... 379/373.02 |
| 2003/0128115 A1 | 7/2003 | Giacopelli et al. .......... 340/506 |
| 2003/0134661 A1 | 7/2003 | Rudd et al. .................. 455/557 |
| 2003/0156660 A1 | 8/2003 | Zoltowski et al. .......... 375/301 |
| 2003/0190018 A1 | 10/2003 | Bleile et al. ................ 379/67.1 |
| 2003/0235219 A1 | 12/2003 | Kapadia et al. ............. 370/535 |
| 2004/0024660 A1 | 2/2004 | Ganesh et al. ................ 705/28 |

| | | | |
|---|---|---|---|
| 2004/0045096 A1 | 3/2004 | Mani et al. ..................... 8/142 |
| 2004/0160372 A1 | 8/2004 | Pulver ........................ 343/725 |
| 2004/0165681 A1 | 8/2004 | Mohan ........................ 375/322 |
| 2004/0177310 A1 | 9/2004 | Mohan et al. ............... 714/776 |
| 2004/0178905 A1 | 9/2004 | Dernier et al. .............. 340/500 |
| 2004/0214569 A1 | 10/2004 | Cardina et al. ........... 455/426.1 |
| 2004/0266418 A1 | 12/2004 | Kotzin ........................ 455/420 |
| 2004/0267535 A1 | 12/2004 | Kotzin ........................ 704/275 |
| 2005/0025299 A1 | 2/2005 | Tischer et al. .............. 379/199 |
| 2005/0025305 A1 | 2/2005 | Tischer et al. ......... 379/373.02 |
| 2005/0025308 A1 | 2/2005 | Tischer et al. ......... 379/413.02 |
| 2005/0032435 A1 | 2/2005 | Tischer et al. .............. 439/676 |
| 2005/0129224 A1 | 6/2005 | Piket et al. ............ 379/406.01 |
| 2005/0129225 A1 | 6/2005 | Piket et al. ............ 379/406.01 |
| 2005/0129226 A1 | 6/2005 | Piket et al. ............ 379/406.01 |
| 2005/0143016 A1 | 6/2005 | Becker et al. ................ 455/74 |
| 2005/0143017 A1 | 6/2005 | Lopp et al. ................. 455/74.1 |
| 2005/0143149 A1 | 6/2005 | Becker et al. ........... 455/575.1 |
| 2005/0143671 A1 | 6/2005 | Hastings et al. ............. 600/513 |
| 2005/0146431 A1 | 7/2005 | Hastings et al. ........ 340/539.12 |
| 2005/0148890 A1 | 7/2005 | Hastings ..................... 600/509 |
| 2005/0151640 A1 | 7/2005 | Hastings ................ 340/539.11 |

FOREIGN PATENT DOCUMENTS

| | | |
|---|---|---|
| GB | 2 253 119 | 8/1992 |
| GB | 2 283 881 A | 5/1995 |
| GB | 2 285 556 A | 7/1995 |
| WO | WO 98/28929 A1 | 7/1998 |
| WO | WO 01/58181 A2 | 8/2001 |

OTHER PUBLICATIONS

VOX2 Voxlink Cellphone Docking Station www.cellantenna.com/Dockingstations/VOX2dockingstation.htm; CellAntenna Corporation; Sep. 26, 2002.
CellAntenna Corporation: Cellular Antennas, accessories, cellphone products. www.cellantenna.com/; CellAntenna Corporation; Sep. 26, 2002.
Cellular Docking Station for Nokia Motorola Star Tac and Erickson Cellular Phones www.cellantenna.com/Dockingstations/dockingstations.htm; CellAntenna Corporation; Sep. 26, 2002.
VOX2 Cellphone Base Station Model No. 131 Vox.Link User Guide, Rev. 1.02.
Applicant's Statement.
(Spec Sheet) AdvanceTec—AdvanceCommunicator®—Nokia Product Sheet; 1 page.
(Spec Sheet) AdvanceTec—OEM Services; AdvanceTec—The Company; 1 page.
(Spec Sheet) Bluetooth enabled technology; ELBT595; 1 page.
(Spec Sheet) Cell Antenna—Introducing CELLDOCK; 1 page.
(Spec Sheet) MERGE by Cidco Communications—Merge for Motoroloa®; Design & Engineering Showcase Honors 2004; 2 pages.
(Spec Sheet) Motorola SD 4505 System Expansion Cellular Phone Docking Station; page last updated Apr. 12, 2005; 1 pg.
(Spec Sheet) RCA 23200RE3—RCA Multi-Handset Cell Docking System; Revised Jun. 6, 2005; 2 pages.
AdvanceTec, The AdvanceTec Solution, Cellular Hands-Free Solution: The Pro-Installed Hands Free, pp. 1-4.
Cellsocket, Welcome to WHP Wireless, Aug. 17, 2005. p. 1.
CellSocket, www.cellantenna.com/Dockingstations/cellsocket.htm; CellAntenna Corporation; Sep. 26, 2002.
Co-pending U.S. Appl. No. 09/999,806, filed Oct. 24, 2001: Entitled: Cellular Docking Station.
Co-pending U.S. Appl. No. 11/048,132, filed Feb. 1, 2005; Entitled: Auto Sensing Home Base Station for Mobile Telephone with Remote Answering Capabilities.
Co-pending U.S. Appl. No. 10/851,932, filed May 21, 2004; Entitled: Wireless Backup Telephone Device and Associated Support System http://www.hometoys.com/news.php4?section=enhancedview&id=17792169; printed Aug. 17, 2005; 3 pages.
MercuryNews.com, Dock makes cell convenient at home, Jul. 25, 2005, pp. 1-4.
Motorola, SD4505—Cell phone dock module for SD4500 Series, Aug. 17, 2005, pp. 1-2.
PhoneLabs, PhoneLabs Products, Aug. 17, 2005, pp. 1-2.
RCA Communications, RCA Cell Docking System 23200RE3, Aug. 17, 2005, pp. 1-2.
RCA, Innovative RCA Cell Docking System Allows Cell Users to Make and Receive Calls Through a Home Phone, Aug. 17, 2005, pp. 1-3.
Telular Corporation, 2004 Annual Report, Making wireline replacement a reality, pp. 1-58, 76 pages total.
Thomson Group, Annual Report, Jun. 3, 2005, pp. 1-180.
Thomson Group, Index to Consolidated Financial Statement, Jun. 3, 2005, F1-F7, 150 pgs total.
VOX2 Cellphone Base Station Model No. 131; Vox.link User Guide, Rev. 1.02; 1 page.
VOX2 Voxlink Cellphone Docking Station, www.cellantenna.com/Dockingstations/VOX2dockingstation.htm: CellAntenna Corporation; Sep. 26, 2002.
US 6,876,861, 04/2005, Frank et al. (withdrawn)

* cited by examiner

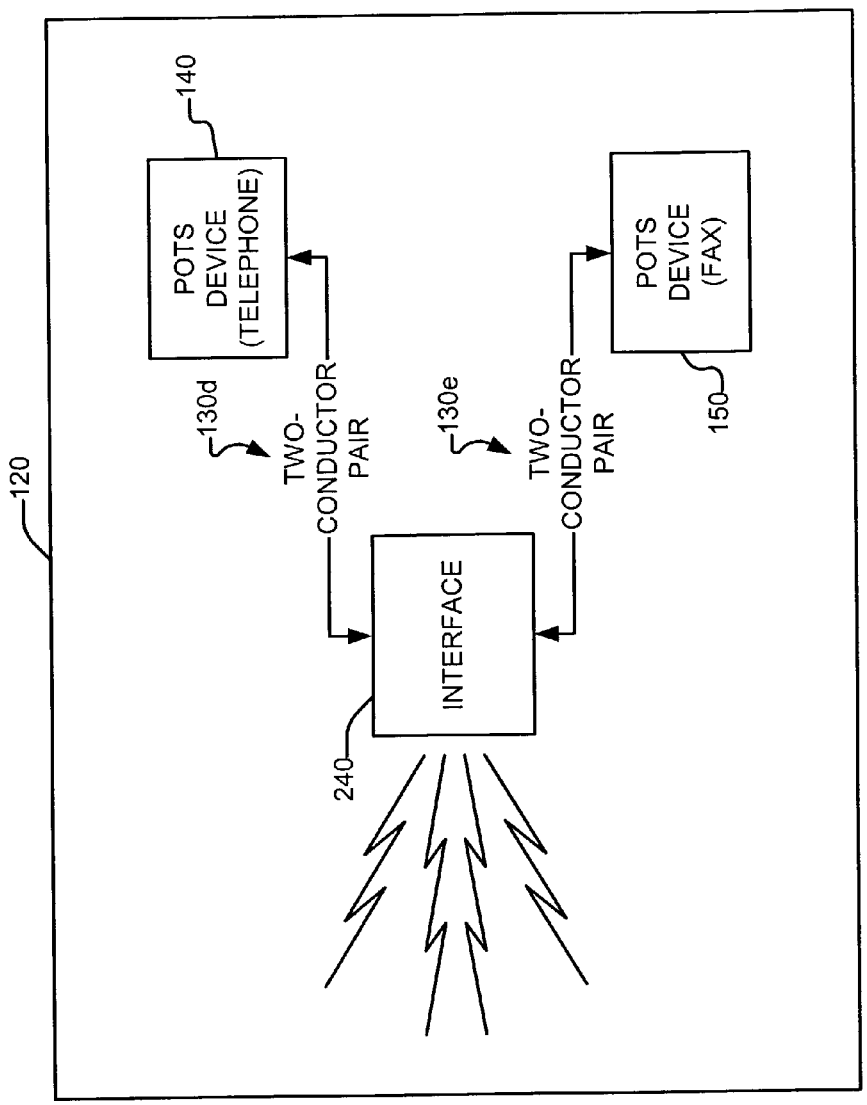
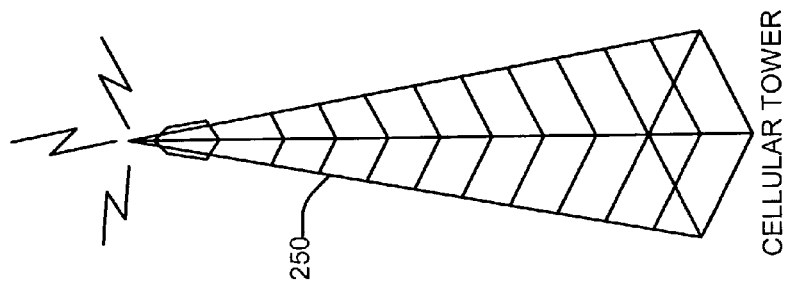
FIG. 2

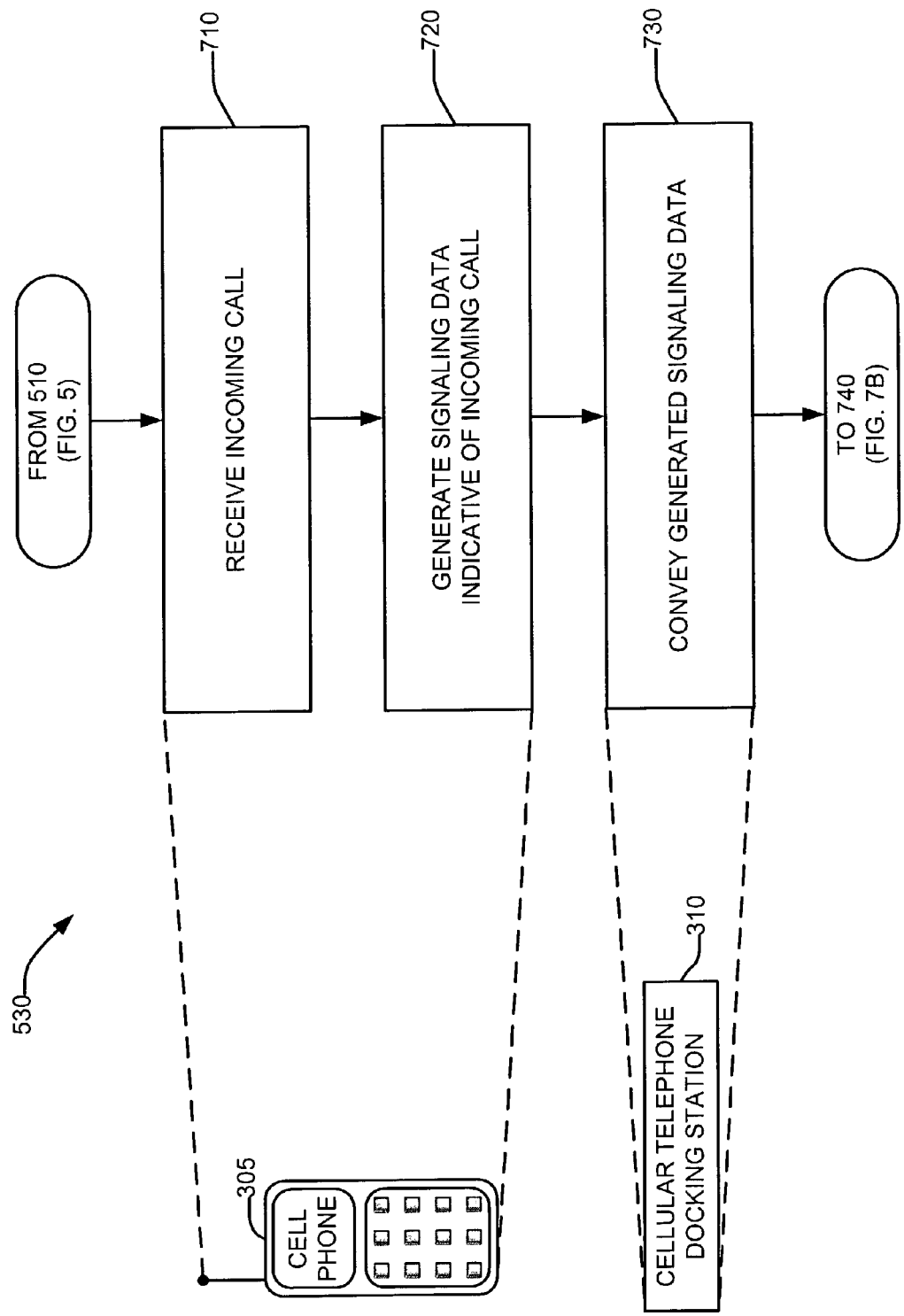

SYSTEM AND METHOD FOR INTERFACING PLAIN OLD TELEPHONE SYSTEM (POTS) DEVICES WITH CELLULAR NETWORKS

FIELD OF INVENTION

The present invention relates generally to telecommunications and, more particularly, to a system and method for interfacing plain old telephone system (POTS) devices with cellular networks.

BACKGROUND

The telephone has greatly facilitated communications between parties, especially when great distances separate the parties. Metropolitan cities and suburbs typically have sufficient access to a public switched telecommunications/telephone network (PSTN), as well as cellular networks. However, in most instances, owners of cellular telephones and plain old telephone system (POTS) devices are inconvenienced by having two telephones operating under two separate systems, which, typically, further inconveniences each owner with two separate telephone numbers. There is, therefore, a need in the art for a system and method that permits the convenience of consolidating both POTS and cellular systems.

SUMMARY

A system and method are provided for interfacing plain old telephone system (POTS) devices with cellular networks.

Briefly described, in architecture, one embodiment, among others, of the system comprises an interface configured to convert a POTS compatible signal to a cellular network compatible signal. The interface is further configured to convert a cellular network compatible signal to a POTS compatible signal. In addition to the interface, the embodiment comprises a POTS connector configured to couple a POTS device to the interface.

Another embodiment, among others, may be seen as a method for interfacing POTS devices to cellular networks. In this regard, one embodiment of the method may be seen as comprising the steps of converting a cellular network compatible signal to a POTS compatible signal, and converting a POTS compatible signal to a cellular network compatible signal.

Other systems, methods, features, and advantages will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram showing one embodiment of the system for interfacing POTS devices with cellular networks.

FIGS. 7A and 7B are flowcharts showing another embodiment of the method associated with the conversion of cellular network compatible signals to POTS compatible signals.

DETAILED DESCRIPTION OF THE PREFERRED EMBODIMENTS

Reference will now be made in detail to the description. While several embodiments of the invention will be described in connection with these drawings, there is no intent to limit it to the embodiment or embodiments disclosed therein. On the contrary, the intent is to cover all alternative, modifications, and equivalents included within the spirit and scope of the invention as defined by the claims.

Figure 1:
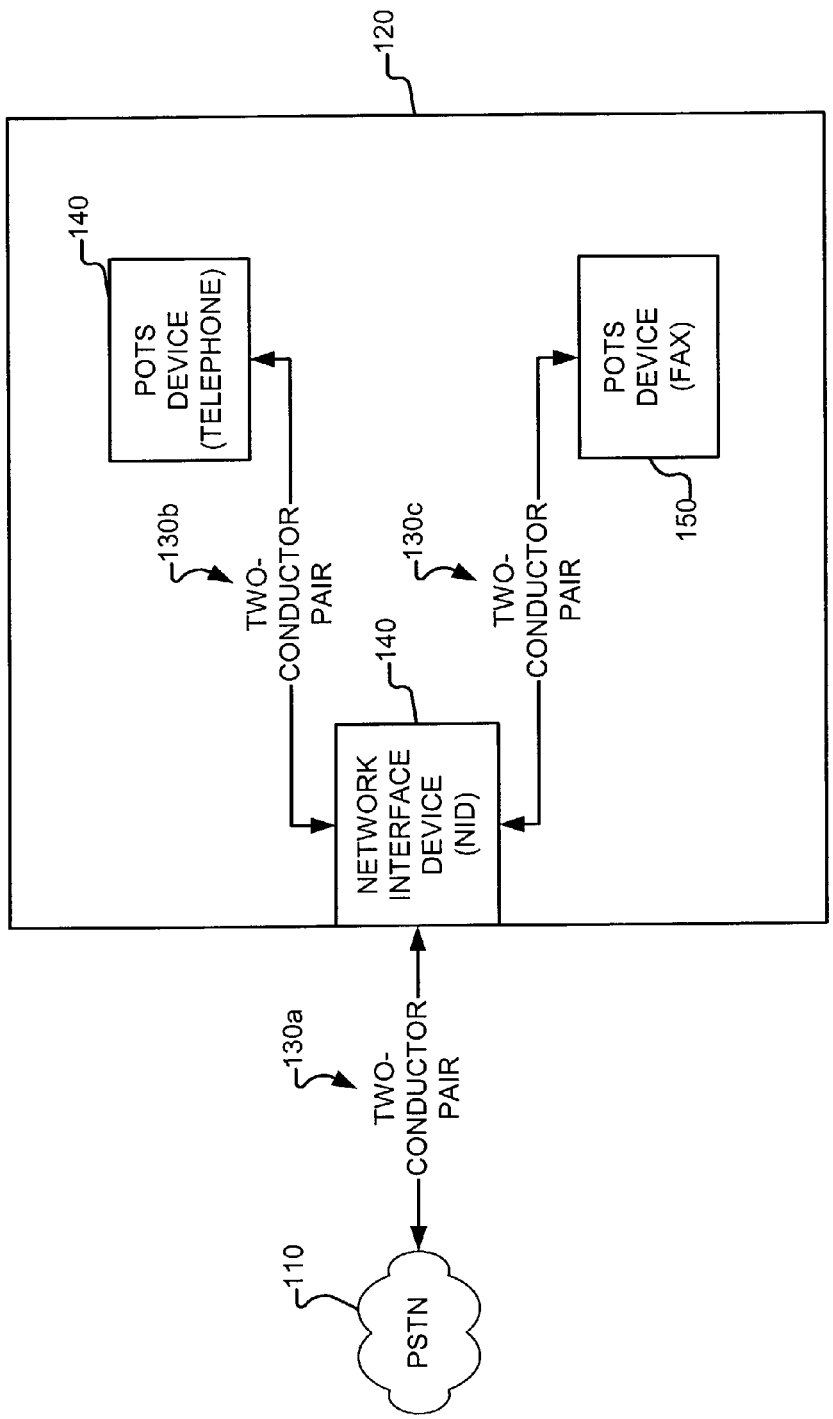
FIG. 1 is a block diagram showing a conventional plain old telephone system (POTS) connection to a telephone company through a network interface device.

FIG. 1 is a block diagram showing a conventional plain old telephone system (POTS) connection to a public switched telephone network (PSTN) 110 through a network interface device (NID) 140. Since such connections are well known, only a cursory discussion is presented here. As shown in FIG. 1, several POTS devices 140, 150 occupy a location 120 (e.g., home, business, etc.). Each POTS device 140, 150 is connected to the NID 140 by two-conductor pair wires 130*b*, 130*c*, also known as POTS pairs, or twisted pairs. The NID 140 serves as the interface between the POTS devices 140, 150 and the PSTN 110, wherein the NID 140 is connected to the PSTN 110 through at least a two-conductor pair 130*a* or landline 130*a*. As evident from FIG. 1, if the landline 130*a* is severed, or if the landline 130*a* is unavailable due to geographical limitations, then the POTS devices 140, 150 within the location 120 have no connection to the PSTN 110.

FIG. 2 is a block diagram showing one embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface 240, thereby permitting connection between the POTS devices 140, 150 and a cellular network. In this sense, the POTS devices 140, 150 are connected to the interface 240, rather than an NID 140 (FIG. 1), by two-conductor pair wires 130*d*, 130*e*. Since the interface 240 is a bridge between the POTS devices 140, 150 and the cellular network, the interface 240 is configured to receive POTS compatible signals from the POTS devices 140, 150 and convert the POTS compatible signals to cellular network compatible signals, which are transmitted from the interface 240 to the cellular tower 250. Additionally, the interface 240 is configured to receive cellular network compatible signals from the cellular tower 250 and convert the cellular network compatible signals to POTS compatible signals, which are then forwarded to the POTS devices 140, 150 for use within the location 120. While a specific PSTN network is now shown in FIG. 2, it will be clear to one of ordinary skill in the art that the cellular tower 250 may be connected to a PSTN network, thereby permitting communication with other PSTN devices.

Figure 3:
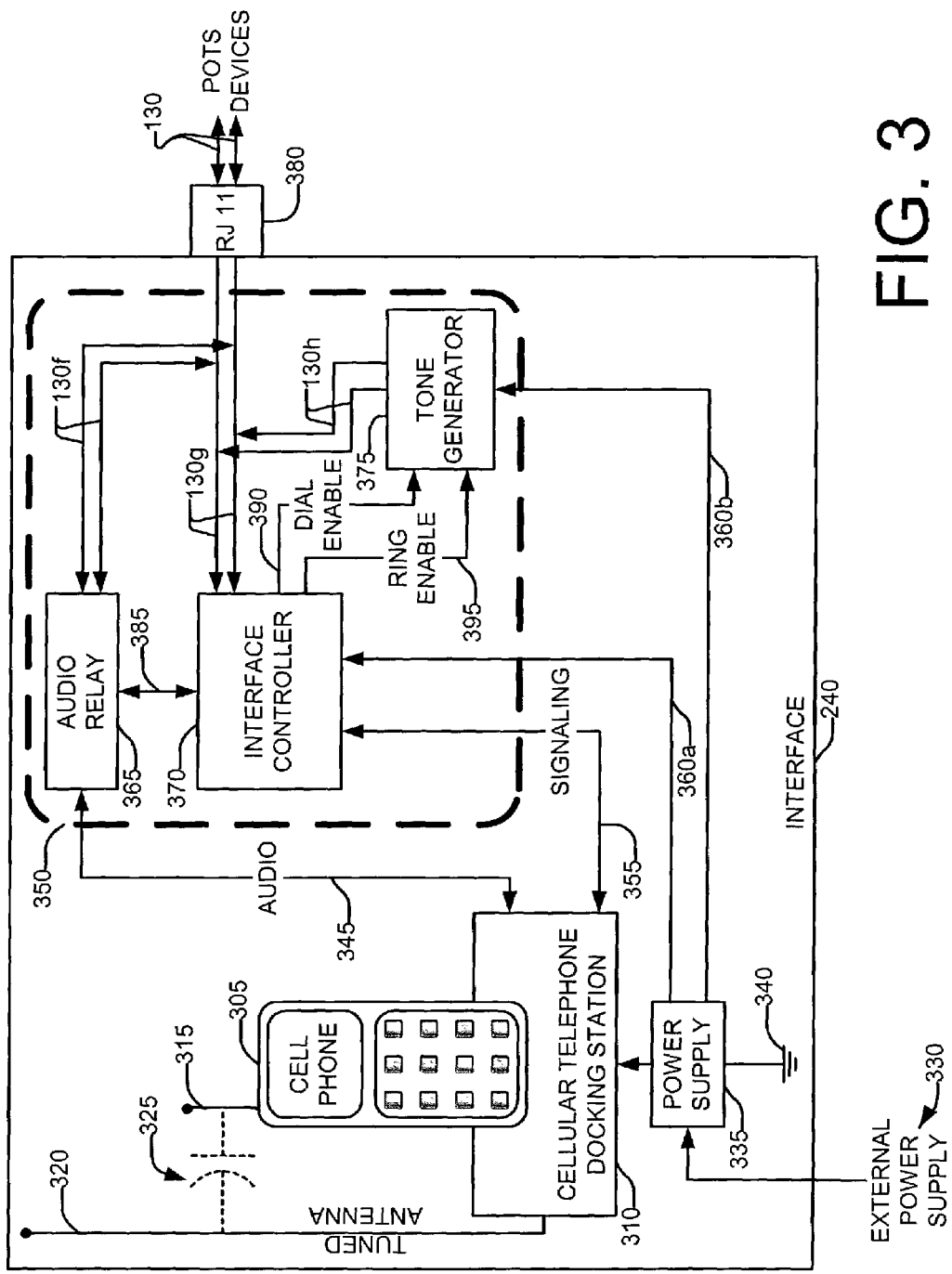
FIG. 3 is a block diagram showing one embodiment of the interface of FIG. 2.

FIG. 3 is a block diagram showing, in greater detail, a preferred embodiment of the interface 240 of FIG. 2. In the preferred embodiment, the cellular network compatible signals are transmitted and received at the interface 240 by a cellular telephone 305 while the POTS compatible signals are transmitted and received at the interface 240 through a POTS connector 380, such as an RJ11 connector 380. Thus, in the preferred embodiment, the interface 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitive coupling 325, as shown in FIG. 3. In addition to interfacing with a cellular telephone 305 through one of a variety of conventional connectors (not shown), the cellular phone docking station 310 is configured to receive signaling data through signaling line 355, which may include commands associated with outgoing telephone calls. Thus, in one embodiment, the signaling data on signaling line 355 may be indicative of a telephone number. The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 305 may modify the signaling data on signaling line 355 appropriately (e.g., amplify, attenuate, reformat, etc.), or, alternatively, the cellular phone docking station 305 may relay the signaling data on signaling line 355 without modification. Regardless of whether or not the signaling data on signaling line 355 is modified, several aspects of the conveyed signal are discussed below, in greater detail, with reference to other components 350 associated with the interface 240.

In addition to the cellular phone docking station 310, the interface 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2)), the audio relay 365 receives analog-audio signals 345 from the cellular phone docking station 310 and transmits the analog-audio signals 345 to the POTS devices 140, 150 (FIG. 2) through the POTS connector (e.g., RJ11 connector) 380. Similarly, for outgoing analog-audio signals 345 (i.e., audio from the POTS devices 140, 150 (FIG. 2) to the cellular telephone 305), the analog audio signals 345 are received by the audio relay 365 through the POTS connector 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS connector 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data, therefore, 355 instructs the cellular telephone 305 to dial the number. In one embodiment, when the number has been dialed and the called party picks up the phone, the cellular telephone 305 detects the connection and conveys an analog-audio signal 345 to the audio relay 365. In this embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS connector 380. In this embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one embodiment. The audio relay 365, in turn, transmits the disconnect information to the interface controller 370, and the interface controller 370 subsequently generates the audio-control signal 385 to disable the audio relay 365.

In another embodiment, information relating to the connected call is transmitted to the interface controller 370 as signaling data on signaling line 355, rather than as an analog-audio signal 345. In this embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS connector 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one embodiment, the information is conveyed to the interface controller 370 through the audio relay 365. Thus, in this embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 35 for bi-directional audio communication between the POTS device 140, 150 (FIG. 2) and the cellular telephone 305. When the call ends, the system disconnects as described above.

In another embodiment, the information is conveyed to the interface controller 370 through signaling data on signaling line 355. Thus, in this embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
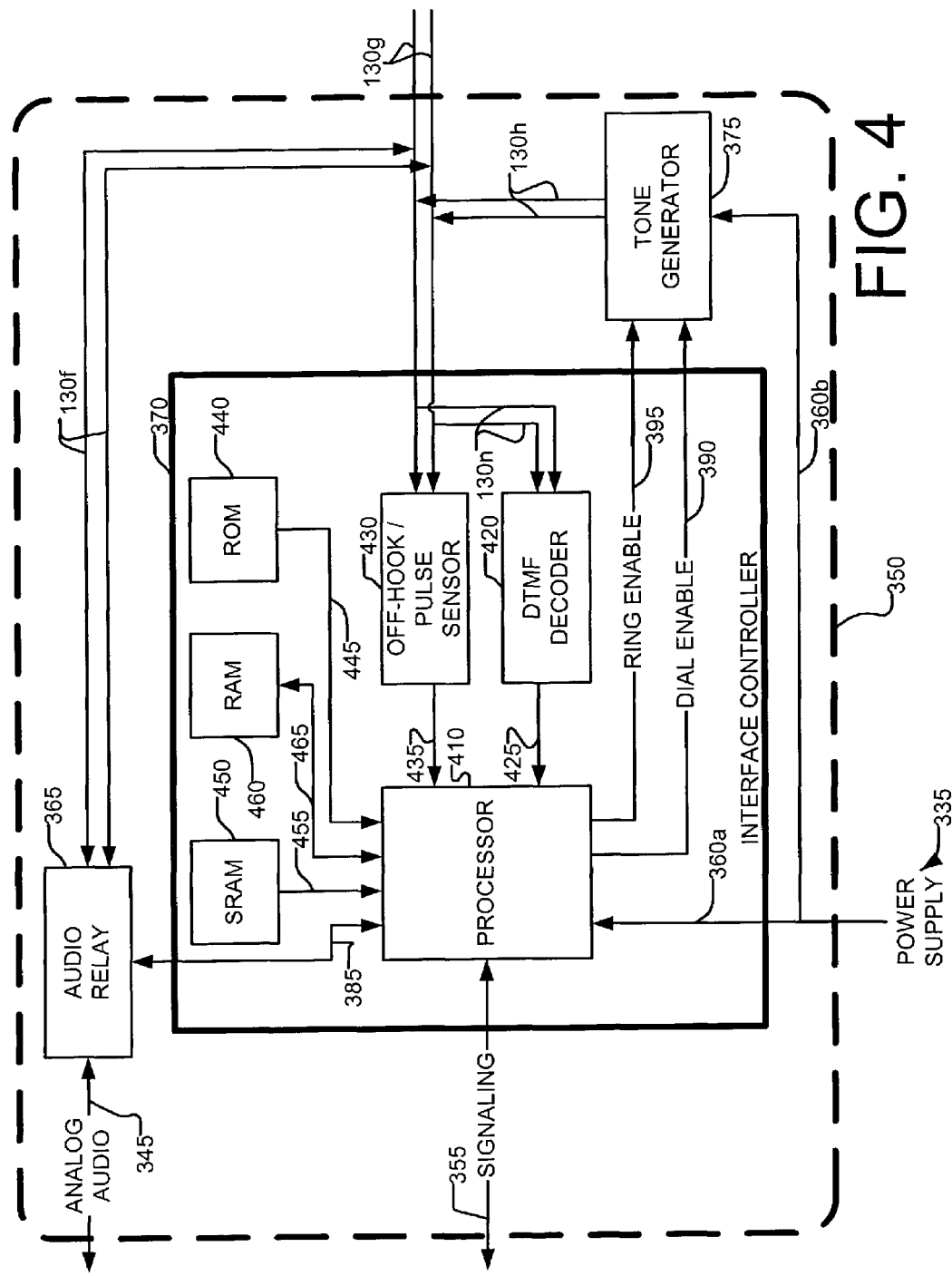
FIG. 4 is a block diagram showing one embodiment of the hardware within the interface of FIG. 3.

FIG. 4 is a block diagram showing the interface controller 370 of FIG. 3 in greater detail. The interface controller 370 is shown in FIG. 4 as comprising a processor 410, random-access memory (RAM) 460, read-only memory (ROM) 440, static-random-access memory (SRAM) 450, an off-hook/pulse sensor 430, and a dual-tone multi-frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS connector 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150

(FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represent a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various embodiments of the system will permit the interfacing of POTS devices 140, 150 (FIG. 2) with a cellular network. Specifically, in one embodiment, POTS devices 140, 150 (FIG. 2) are interfaced with the cellular network through a cellular telephone 305 (FIG. 3), which is attached to the interface 240 at a cellular phone docking station 310. In addition to the various systems, as described above, another embodiment of the invention may be seen as a method for interfacing POTS devices 140, 150 (FIG. 2) with cellular networks. Several embodiments of the method are described with reference to FIGS. 5 through 12 below.

Figure 5:
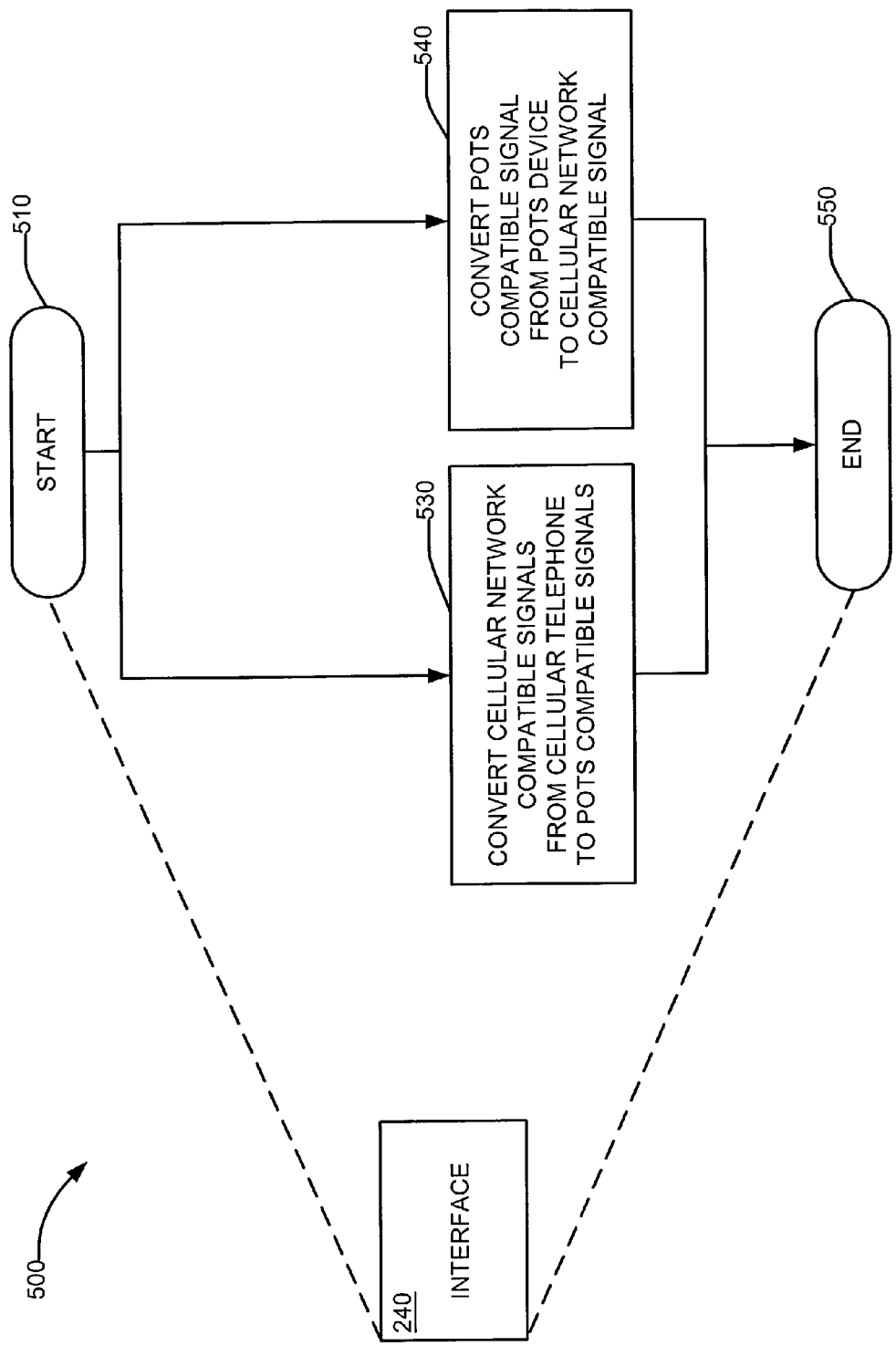
FIG. 5 is a flowchart showing one embodiment of the method for interfacing POTS devices with cellular networks.

FIG. 5 is a flowchart showing one embodiment of the method for interfacing POTS devices with cellular networks. In a broad sense, once a POTS device 140, 150 (FIG. 2) has been coupled to a cellular telephone 305 (FIG. 3) through an interface 240 (FIG. 2), this embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred embodiment, the converting steps 530, 540 are performed at the interface 240.

Figure 6A:
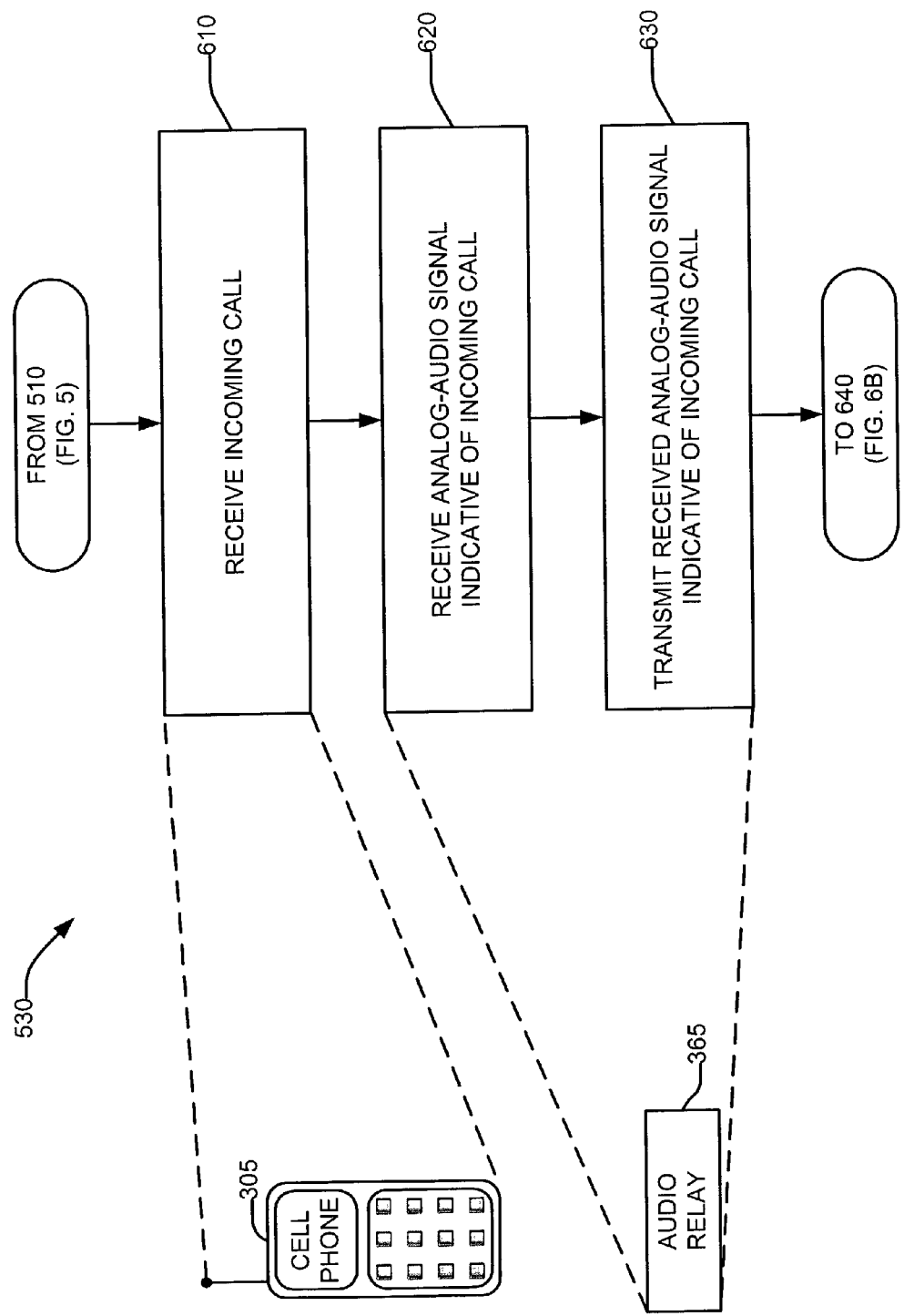
FIGS. 6A and 6B are flowcharts showing one embodiment of the method associated with the conversion of cellular network compatible signals to POTS compatible signals.
Figure 6B:
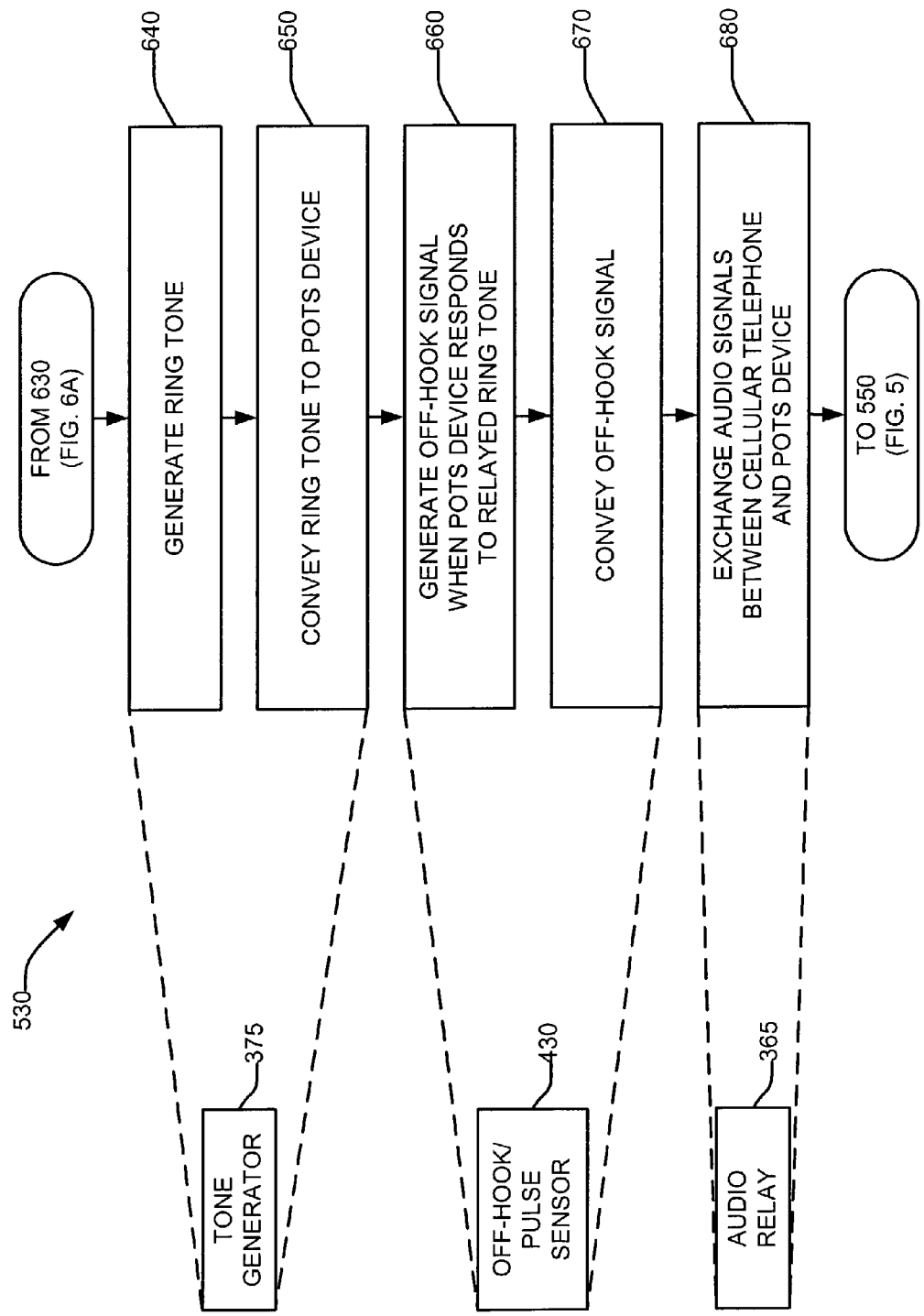

FIGS. 6A and 6B are flowcharts showing one embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7B:
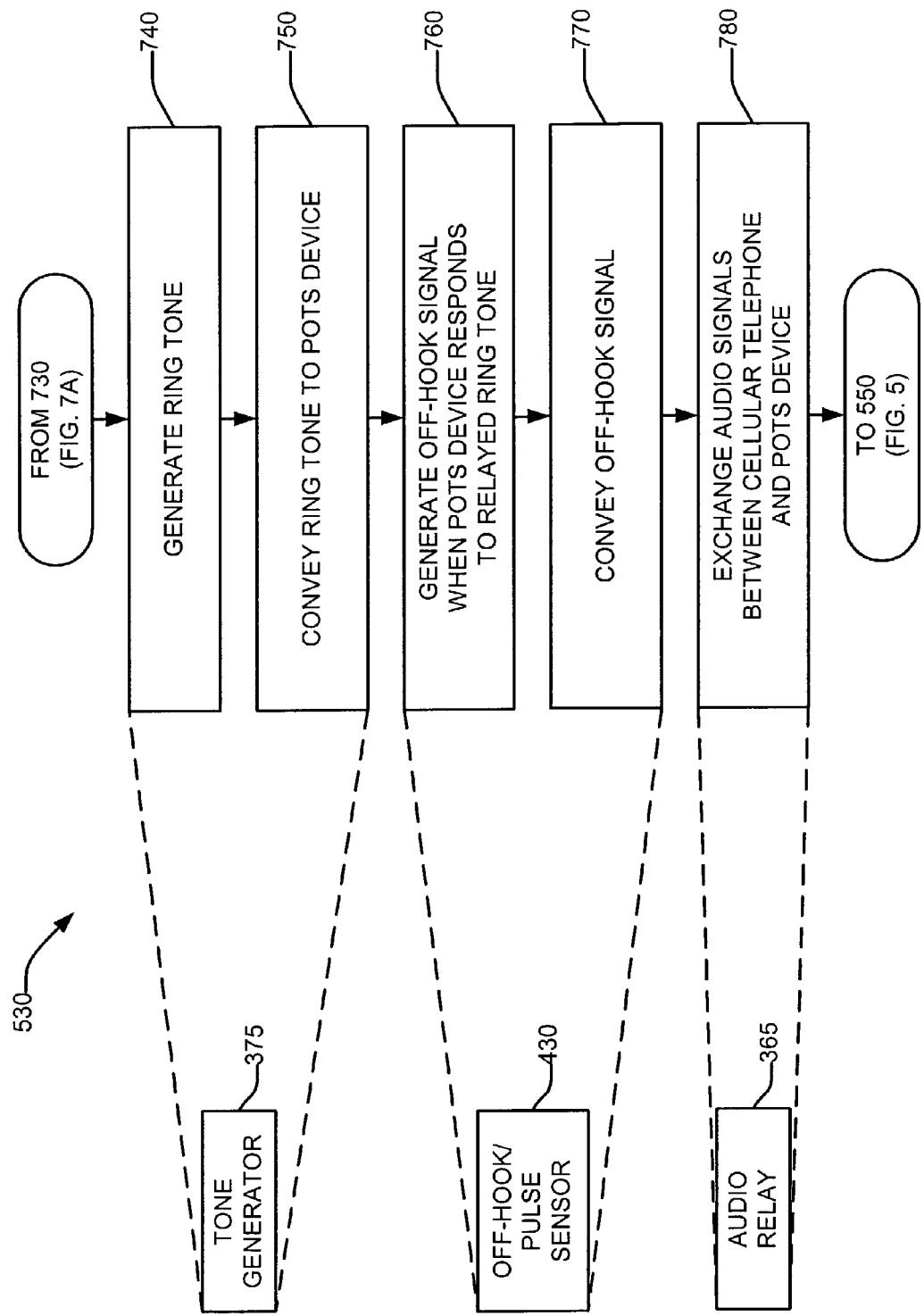

FIGS. 7A and 7B are flowcharts showing another embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the embodiment of FIGS. 6A and 6B, once the incoming call is received 710, the system generates, in step 720, signaling data on signaling line 355

(FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this embodiment, once the incoming call is connected between the cellular telephone 305 (FIG. 3) and the POTS device 140, 150 (FIG. 2), the POTS device 140, 150 (FIG. 2) freely communicates through the cellular network.

Figure 8:
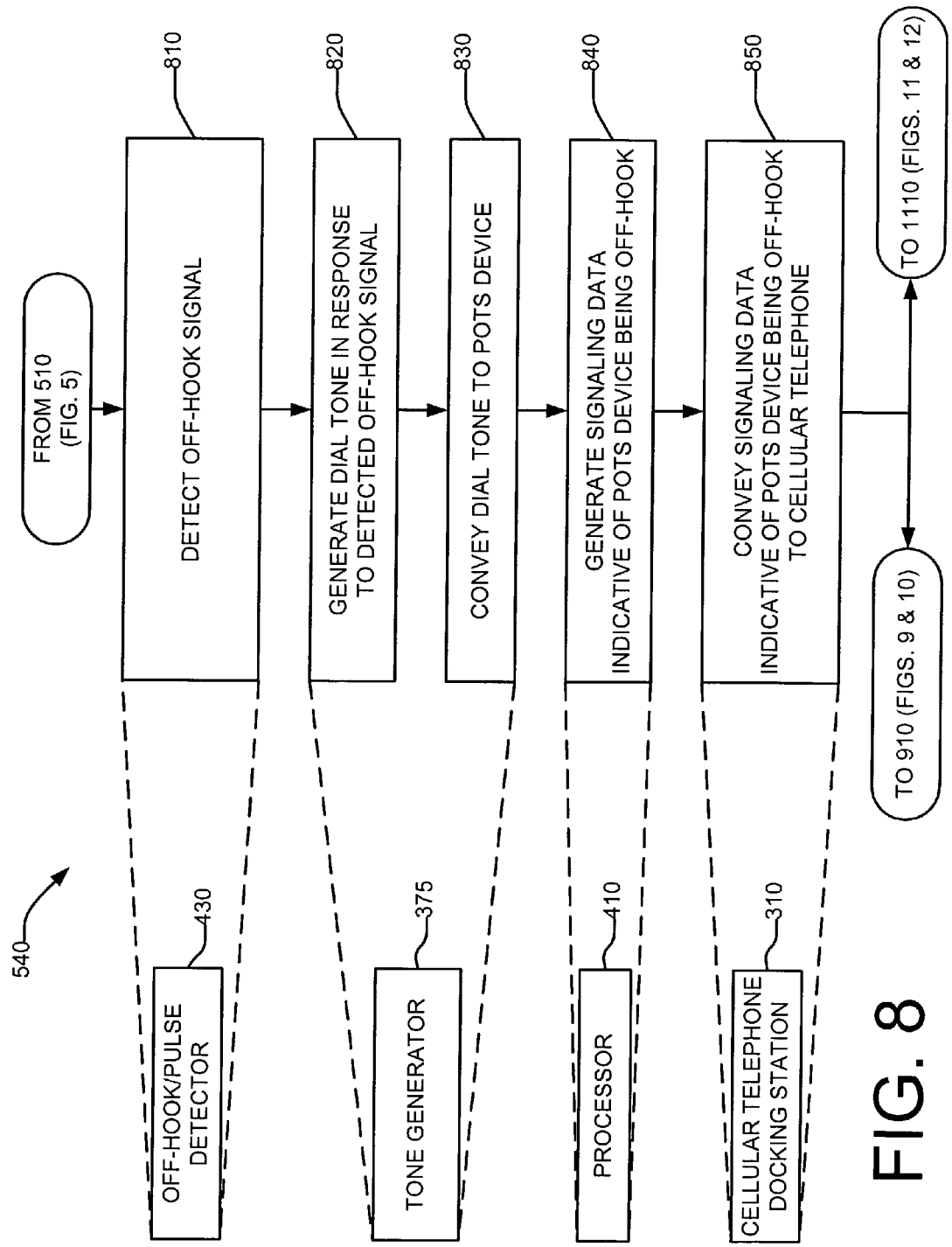
FIG. 8 is a flowchart showing several steps associated with the conversion of POTS compatible signals to cellular network compatible signals.

FIG. 8 is a flowchart showing several steps associated with the conversion 540 of POTS compatible signals to cellular network compatible signals. As described above, the interface 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In a preferred embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating 820 the dial tone, the system further generates, in step 840, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another embodiment, the step of generating 840 signaling data on signaling line 355 (FIG. 3) may be completely.

Figure 9:
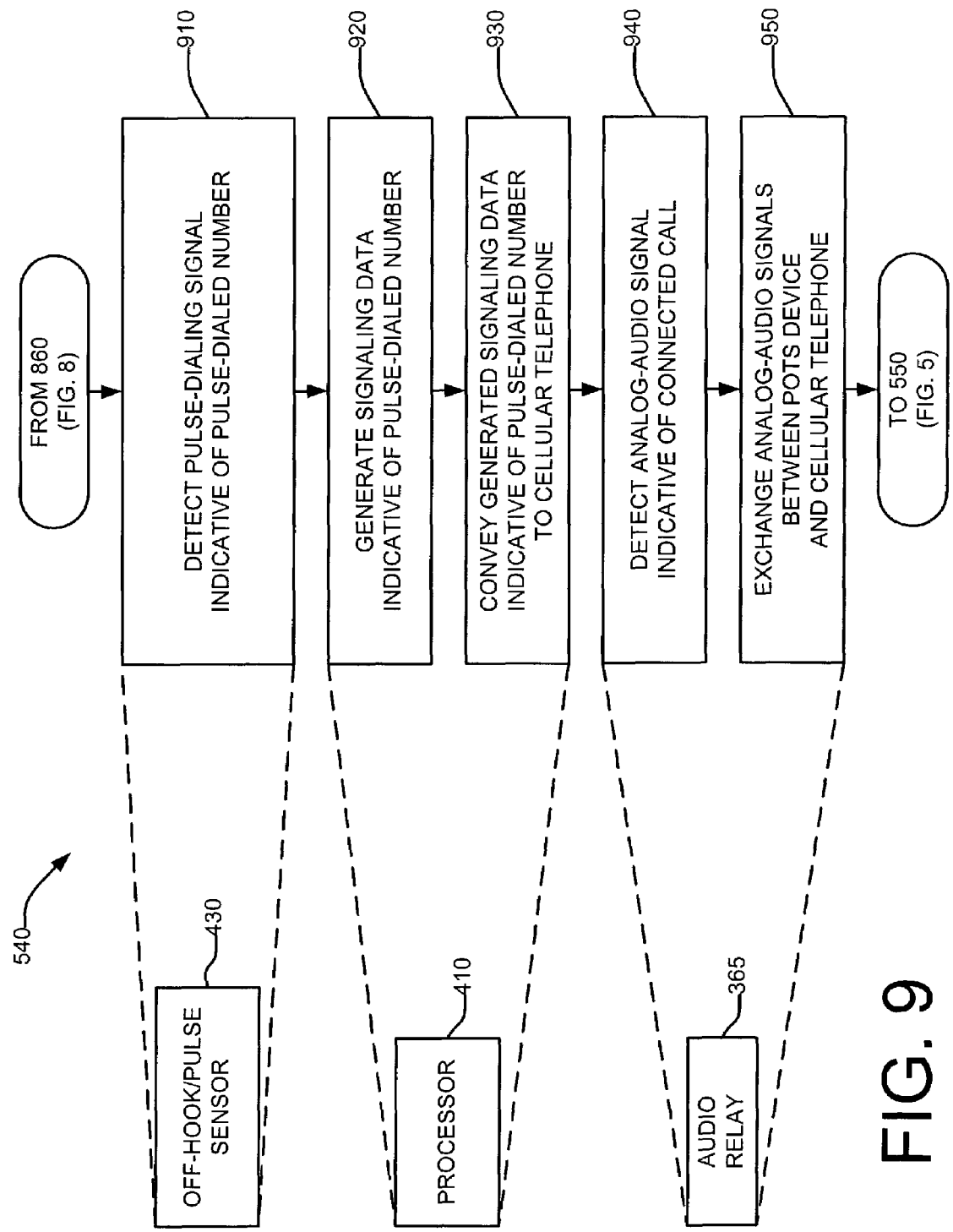
FIGS. 9 through 12 are flowcharts showing several embodiments of the method associated with the conversion of POTS compatible signals to cellular network compatible signals.
Figure 10:
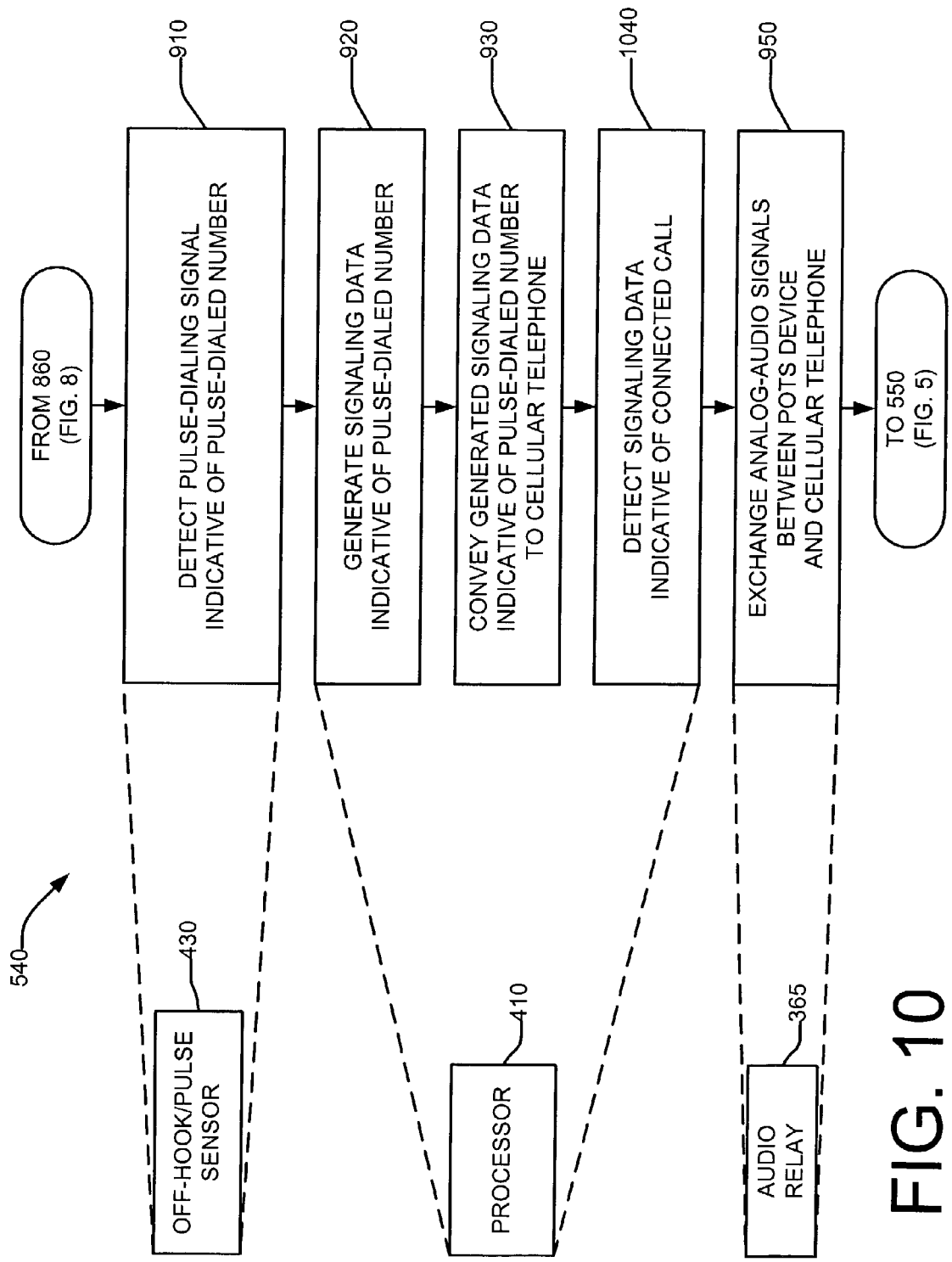

FIGS. 9 and 10 are flowcharts showing several embodiments of the method associated with pulse dialing. As shown in FIG. 9, in one embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data one signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchange, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

FIG. 10 is a flowchart showing, in greater detail, another embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305

(FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
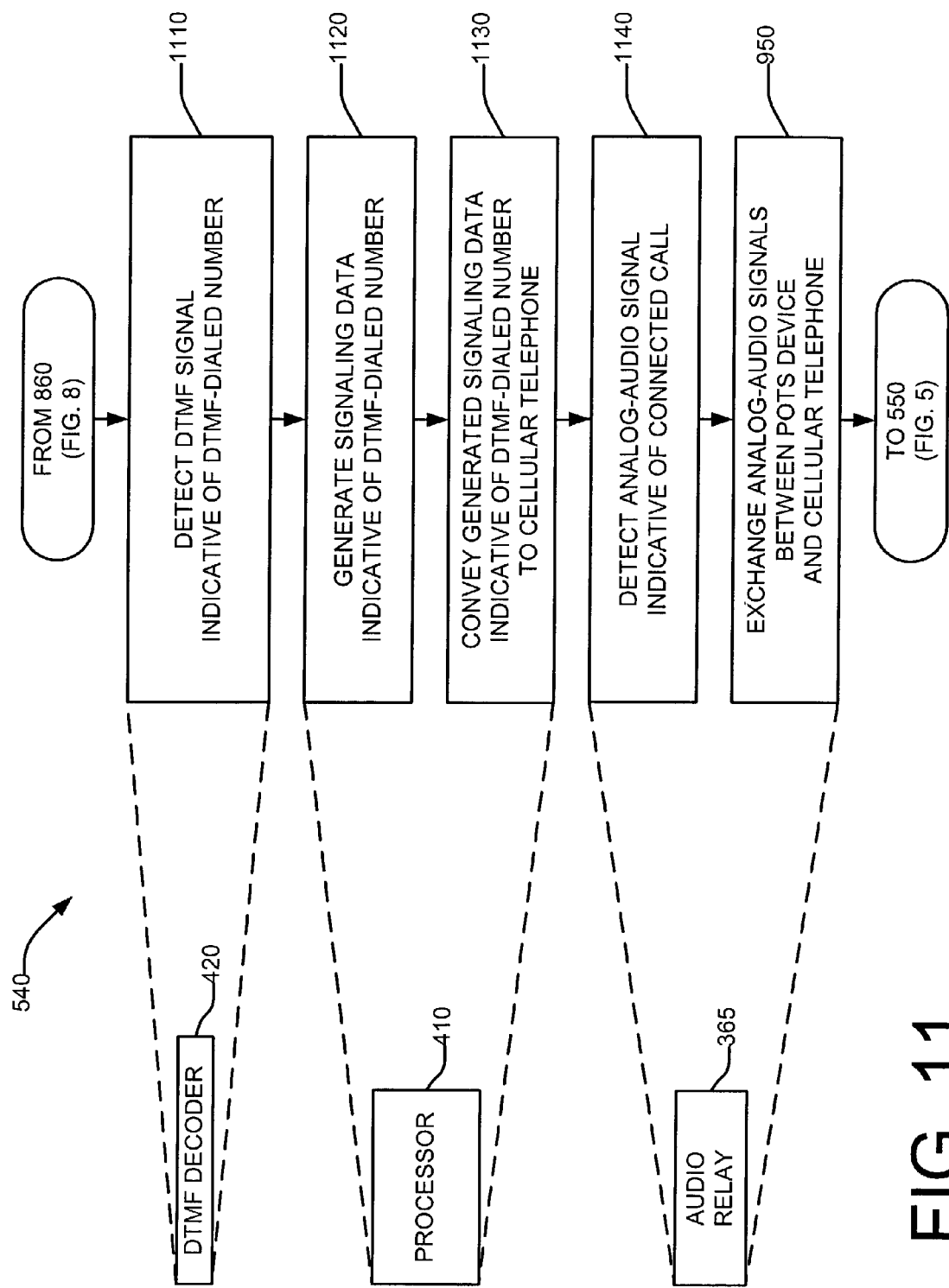
Figure 12:
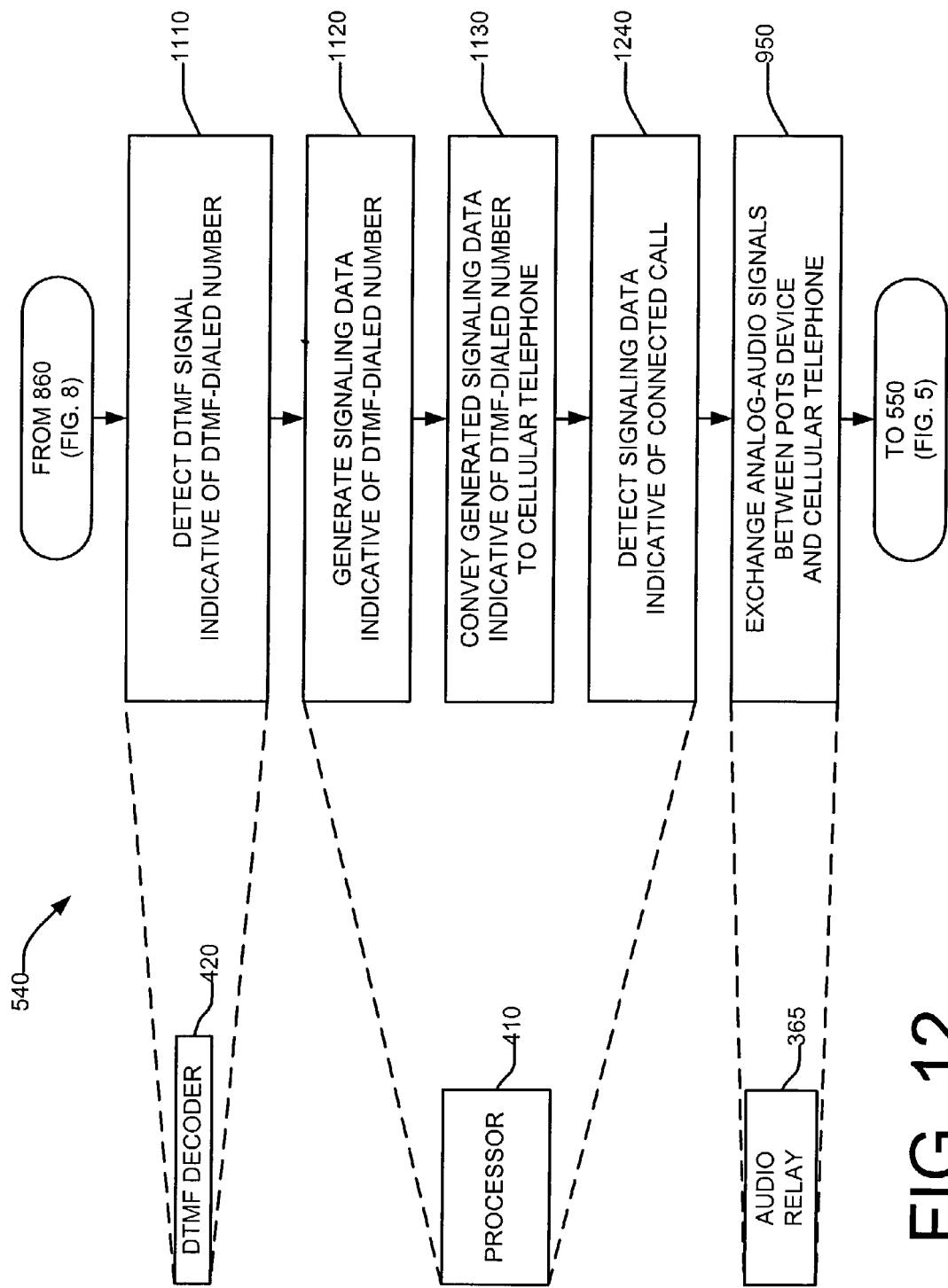

FIGS. 11 and 12 are flowcharts showing several embodiments of the method associated with "tone" dialing. As shown in FIG. 11, in one embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an application specific integrated circuit (ASIC) having appropriate combinational logic gates, a programmable gate array (PGA), a field programmable gate array (FPGA), etc.

Additionally, while exemplary embodiments of the present invention have been shown and described, it will be apparent to those of ordinary skill in the art that a number of changes, modifications, or alterations to the invention as described may be made, none of which depart from the spirit of the present invention. For example, while a cellular telephone 305 (FIG. 3) is used as the bridge between the POTS devices 140, 150 (FIG. 2) and the cellular network, it will be clear to one of ordinary skill in the art that any cellular device may be used as the bridge, such as a cellular compatible personal digital assistant (PDA), cellular modem, or any other cellular device that is configured to transmit and receive data from a cellular network. Furthermore, while the flowcharts of FIGS. 5 through 12 show several embodiments of the method as being performed in sequential order, it will be clear to one of ordinary skill in the art that several of the method steps may be taken out of order without adverse effect to the invention. For example, the step of generating a dial tone and the step of generating signaling data may occur substantially concurrently. Alternatively, the step of generating signaling data may occur prior to the step of generating the dial tone. Furthermore, the step of generating signaling data indicative of POTS devices being off-hook may be completely removed without detriment to the invention. These and other such changes, modifications, and alterations should therefore be seen as within the scope of the present invention.

I claim:

1. A system for interfacing plain old telephone system (POTS) devices with cellular networks, comprising:
    an interface configured to convert a POTS compatible signal to a cellular network compatible signal, wherein the interface is further configured to convert a cellular network compatible signal to a POTS compatible signal, wherein the interface comprises a docking station configured to interface with a cellular telephone, wherein the docking station comprises a tuned antenna configured to couple with the cellular telephone, wherein the tuned antenna is further configured to improve transmission and reception by the cellular telephone; and
    a POTS connector configured to couple a POTS device to the interface;
    wherein the interface includes an audio relay configured to receive an audio-control signal and transmit an analog-audio signal between the POTS device and the cellular telephone in response to the received audio-control signal; and wherein when the system detects an analog-audio signal that is indicative of a called-party telephone ringing prior to a called party picking up the called party telephone, the cellular telephone and the POTS device are connected through at least one of the cellular networks prior to the called party picking up the called party telephone.

2. The system of claim 1, wherein the POTS connector is an RJ11 connector.

3. The system of claim 1, wherein the docking station is further configured to convey signaling data to the cellular telephone.

4. The system of claim 3, wherein the signaling data is indicative of a telephone number.

5. The system of claim 1, wherein the docking station is further configured to convey signaling data from the cellular telephone and wherein when the system detects an analog-audio signal that is indicative of a called-party telephone being busy, the cellular telephone and the POTS device are connected through at least one of the cellular networks prior to the called party picking up the called party telephone.

6. The system of claim 5, wherein the signaling data is indicative of an incoming telephone call.

7. The system of claim 1, wherein the interface comprises:
an interface controller configured to generate a tone-enable signal and the audio-control signal, wherein the interface controller is further configured to transmit signaling data to a cellular telephone; and
a tone generator configured to receive the tone-enable signal from the interface controller and generate a tone in response to the received tone-enable signal.

8. The system of claim 7, wherein the tone-enable signal is a ring-enable signal, and the generated tone is a ring tone.

9. The system of claim 7, wherein the tone-enable signal is a dial-enable signal, and the generated tone is a dial tone.

10. The system of claim 7, wherein the audio relay is further configured to amplify the audio signal in response to the audio-control signal.

11. The system of claim 7, wherein the audio relay is further configured to attenuate the audio signal in response to the audio-control signal.

12. The system of claim 7, wherein the interface controller is further configured to receive signaling data from the cellular telephone and wherein the tuned antenna is configured to couple with an antenna of the cellular telephone in a non-contact manner.

13. The system of claim 7, wherein the interface controller comprises:
an off-hook/pulse sensor configured to detect when the POTS device is off-hook and generate an off-hook signal in response to detecting when the POTS device is off-hook;
a processor configured to receive the off-hook signal from the off-hook/pulse detector and generate signaling data in response to the received off-hook signal, wherein the signaling data is indicative of the POTS device being off-hook.

14. The system of claim 13, wherein the off-hook/pulse sensor is further configured to detect at least one pulse from the POTS device and generate a pulse-dialing signal in response to the detected at least one pulse, wherein the at least one pulse is indicative of a number.

15. The system of claim 14, wherein the processor is further configured to receive the pulse-dialing signal from the off-hook/pulse sensor and generate signaling data in response to the received pulse-dialing signal, wherein the signaling data is configured to instruct a cellular telephone to dial the number indicated by the at least one pulse.

16. The system of claim 13, further comprising a dual tone multi-frequency (DTMF) decoder configured to detect a DTMF signal from a POTS device and generate a DTMF-dialing signal in response to the received DTMF signal, wherein the DTMF signal is indicative of a number.

17. The system of claim 16, wherein the processor is further configured to receive the DTMF-dialing signal from the DTMF decoder and generate signaling data in response to the received DTMF-dialing signal, wherein the signaling data is configured to instruct a cellular telephone to dial the number indicated by the DTMF-dialing signal.

18. The system of claim 13, wherein the processor is further configured to receive an analog-audio signal from the audio relay, wherein the analog-audio signal is indicative of an incoming telephone call.

19. The system of claim 18, wherein the processor is further configured to generate a ring-enable signal in response to the received analog-audio signal indicative of the incoming call.

20. The system of claim 13, wherein the processor is further configured to receive signaling data, wherein the received signaling data is indicative of an incoming telephone call.

21. The system of claim 20, wherein the processor is further configured to generate a ring-enable signal in response to the received signaling data indicative of the incoming call.

22. The system of claim 1, wherein the tuned antenna is coupled with an antenna of the cellular telephone using a capacitive coupling.

23. A method for interfacing a plain old telephone system (POTS) device with a cellular network, comprising the steps of:
providing a tuned antenna configured to improve transmission and reception of signals by a cellular telephone;
receiving a cellular network compatible signal using the tuned antenna;
converting the cellular network compatible signal from the cellular telephone to a POTS compatible signal at an interface;
receiving an audio-control signal and transmitting an analog-audio signal between the POTS device and the cellular telephone in response to the received audio-control signal;
detecting an analog-audio signal that is indicative of a called-party telephone ringing prior to a called party picking up the called party telephone; and
in response to detecting the analog-audio signal that is indicative of a called-party telephone ringing, connecting the cellular telephone and the POTS device through the cellular network to the called party telephone prior to the called party picking up the called party telephone.

24. The method of claim 23, further comprising:
converting a POTS compatible signal from the POTS device to a cellular network compatible signal at the interface; and
transmitting the converted POTS compatible signal using the tuned antenna.

25. The method of claim 24, wherein the step of converting the cellular network compatible signal to the POTS compatible signal comprises the steps of:
receiving an analog-audio signal from the cellular telephone, wherein the analog-audio signal is indicative of an incoming call; and
conveying the received analog-audio signal indicative of the incoming call to an interface controller.

26. The method of claim 25, further comprising the steps of:
  generating a ring tone in response to the step of conveying the analog-audio signal indicative of the incoming call to the interface controller; and
  conveying the generated ring tone to a POTS device.

27. The method of claim 26, further comprising the steps of:
  generating an off-hook signal when POTS device responds to the conveyed ring tone; and
  conveying the off-hook signal to the interface controller.

28. The method of claim 27, further comprising the step of exchanging audio signals between the POTS device and the cellular telephone in response to the step of conveying the off-hook signal to the interface controller.

29. The method of claim 24, wherein the step of converting the cellular network compatible signal to the POTS compatible signal comprises the step of generating signaling data, wherein the signaling data is indicative of an incoming call.

30. The method of claim 29, further comprising the step of conveying the generated signaling data indicative of the incoming call to an interface controller.

31. The method of claim 30, further comprising the steps of:
  generating a ring tone in response to the step of conveying the generated signaling data to the interface controller; and
  conveying the ring tone to a POTS device.

32. The method of claim 31, further comprising the steps of:
  generating an off-hook signal when the POTS device responds to the conveyed ring tone; and
  conveying the off-hook signal to the interface controller.

33. The method of claim 32, further comprising the step of exchanging audio signals between the cellular telephone and the POTS device in response to the step of conveying the off-hook signal to the interface controller.

34. The method of claim 24, wherein the step of converting the POTS compatible signal to the cellular network compatible signal comprises the step of detecting an off-hook signal.

35. The method of claim 34, further comprising the step of generating a dial tone in response to the step of detecting the off-hook signal.

36. The method of claim 35, further comprising the step of conveying the dial tone to the POTS device.

37. The method of claim 34, further comprising the step of generating signaling data in response to the step of detecting the off-hook signal, wherein the signaling data is indicative of the POTS device being off-hook.

38. The method of claim 37, further comprising the step of conveying the generated signaling data indicative of the POTS device being off-hook to the cellular telephone.

39. The method of claim 34, further comprising the steps of:
  detecting a pulse-dialing signal indicative of a pulse-dialed number;
  generating signaling data in response to the step of detecting the pulse-dialing signal, wherein the signaling data is indicative of the pulse-dialed number.

40. The method of claim 39, further comprising the step of conveying the generated signaling data indicative of the pulse-dialed number to the cellular telephone.

41. The method of claim 40, further comprising the step of detecting an analog-audio signal indicative of a connected call.

42. The method of claim 41, further comprising the step of exchanging analog-audio signals between the POTS device and the cellular telephone in response to the connected call.

43. The method of claim 40, further comprising the step of receiving signaling data from the cellular telephone indicative of a connected call.

44. The method of claim 43, further comprising the step of exchanging analogue-audio signals between the POTS device and the cellular telephone in response to the connected call.

45. The method of claim 34, further comprising the steps of:
  detecting a dual-tone multi-frequency (DTMF) signal indicative of a DTMF-dialed number;
  generating signaling data in response to the step of detecting the DTMF signal, wherein the signaling data is indicative of the DTMF-dialed number.

46. The method of claim 45, further comprising the step of conveying the generated signaling data indicative of the DTMF-dialed number to the cellular telephone.

47. The method of claim 46, further comprising the step of detecting analog-audio signal indicative of a connected call.

48. The method of claim 47, further comprising the step of exchanging analog-audio signals between the POTS device and the cellular telephone in response to the connected call.

49. The method of claim 46, further comprising the step of receiving signaling data from the cellular telephone indicative of a connected call.

50. The method of claim 49, further comprising the step of exchanging analog-audio signals between the POTS device and the cellular telephone in response to the connected call.

51. A computer program product comprising a computer-readable medium having control logic stored therein for causing a computer to interface a plain old telephone system (POTS) device with a cellular network, the control logic comprising computer-readable program code for causing the computer to:
  convert a POTS compatible signal from the POTS device to a cellular network compatible signal at an interface;
  transmit the converted POTS compatible signal using a tuned antenna,
  receive a cellular network compatible signal using the tuned antenna;
  convert the cellular network compatible signal from a cellular telephone to a POTS compatible signal at the interface;
  receive an audio-control signal and transmitting an analog-audio signal between the POTS device and the cellular telephone in response to the received audio-control signal;
  detect an analog-audio signal that is indicative of a called-party telephone being busy prior to a called party picking up a called party telephone; and
  in response to detecting the analog-audio signal that is indicative of a called-party telephone being busy, connect the cellular telephone or the POTS device through the cellular network to the called party telephone prior to the called party picking up the called party telephone.

52. The computer program product of claim 51, wherein the POTS device is directly connected to the interface without use of an inversion adapter.

* * * * *